(12) United States Patent
Liu et al.

(10) Patent No.: US 8,247,992 B2
(45) Date of Patent: Aug. 21, 2012

(54) LED DRIVER CIRCUIT

(75) Inventors: Kwang-Hwa Liu, Sunnyvale, CA (US); Shen-Yao Liang, Tainan County (TW)

(73) Assignee: Green Mark Technology Inc., New Taipei (TW)

( * ) Notice: Subject to any disclaimer, the term of this patent is extended or adjusted under 35 U.S.C. 154(b) by 372 days.

(21) Appl. No.: 12/729,237

(22) Filed: Mar. 23, 2010

(65) Prior Publication Data
US 2011/0234110 A1  Sep. 29, 2011

(51) Int. Cl.
*G05F 1/00* (2006.01)
(52) U.S. Cl. ............ 315/291; 315/169.1; 315/185 S; 315/312; 323/282; 323/284; 323/349; 323/351; 345/46; 345/102; 345/212
(58) Field of Classification Search .......... 315/291, 315/294, 169.1–169.3, 185 S, 312; 323/222, 323/224, 280, 282, 284, 349, 351; 345/46, 345/82, 102, 204, 212; 363/21.18, 26
See application file for complete search history.

(56) References Cited

U.S. PATENT DOCUMENTS

| | | | |
|---|---|---|---|
| 6,507,469 B2 | 1/2003 | Andoh | |
| 6,822,403 B2 | 11/2004 | Horiuchi et al. | |
| 6,836,081 B2 | 12/2004 | Swanson et al. | |
| 6,855,586 B2 | 2/2005 | Walker et al. | |
| 7,071,630 B1 | 7/2006 | York | |
| 7,252,408 B2 | 8/2007 | Mazzochette et al. | |
| 7,317,403 B2 | 1/2008 | Grootes et al. | |
| 7,369,384 B2 | 5/2008 | Inaba | |
| 7,410,851 B2 | 8/2008 | Henson et al. | |
| 7,423,389 B2 | 9/2008 | Lee | |
| 7,432,659 B2 | 10/2008 | Park et al. | |
| 7,439,945 B1 | 10/2008 | Awalt et al. | |
| 7,459,959 B2 | 12/2008 | Rader et al. | |
| 7,468,723 B1 | 12/2008 | Collins | |
| 7,476,591 B2 | 1/2009 | Huang et al. | |
| 7,511,437 B2 | 3/2009 | Lys et al. | |
| 7,550,934 B1 | 6/2009 | Deng et al. | |
| 7,605,574 B2 * | 10/2009 | Dearn et al. | ........ 323/284 |
| 7,642,725 B2 | 1/2010 | Cusinato et al. | |
| 7,649,326 B2 | 1/2010 | Johnson et al. | |
| 7,675,245 B2 * | 3/2010 | Szczeszynski et al. | ....... 315/291 |
| 7,714,810 B2 * | 5/2010 | Kasai et al. | ........ 345/76 |
| 7,863,881 B2 * | 1/2011 | Inoue | ........ 323/285 |
| 7,868,602 B2 * | 1/2011 | Omi et al. | ........ 323/284 |

OTHER PUBLICATIONS

Fong et al., Channel Width Effect on MOSFET Breakdown, IEEE Transactions on Electron Devices, vol. 39, No. 5, May 1992, p. 1265-p. 1267.

(Continued)

*Primary Examiner* — Haiss Philogene
(74) *Attorney, Agent, or Firm* — Jianq Chyun IP Office (57) ABSTRACT

A light-emitting diode (LED) driver circuit is provided, which includes a transistor, a current regulator, a release diode, and a voltage clamping device. The transistor is coupled in series with an LED string. The LED string is coupled between the transistor and a bus voltage. The current regulator is coupled to the transistor for regulating the current through the transistor and the LED string to a predetermined current. The release diode has an anode coupled between the LED string and the transistor. The voltage clamping device is coupled to the cathode of the release diode for clamping the voltage level at the cathode of the release diode to a predetermined voltage. The voltage clamping device protects the transistor from breakdown when the transistor is turned off for dimming control.

10 Claims, 6 Drawing Sheets

OTHER PUBLICATIONS

Mikoshiba et al., Comparison of Drain Structures in n-Channel MOSFET's, IEES Transactions on Electron Devices, vol. ED-33, No. 1, Jan. 1986, p. 140-p. 144.

Imam et al., Design and Optimization of Double-RESURF High-Voltage Lateral Devices for a Manufacturable Process, IEES Transactions on Electron Devices, vol. 50, No. 7, Jul. 2003, p. 1697-p. 1701.

* cited by examiner

LED DRIVER CIRCUIT

BACKGROUND OF THE INVENTION

1. Field of the Invention

The present invention relates to a light-emitting diode (LED) driver circuit. More particularly, the present invention relates to an LED driver circuit utilizing a voltage clamping device.

2. Description of the Related Art

LED backlight for television (TV) and liquid crystal display (LCD) for personal computers (PCs) are gaining popularity because LED backlight enables thinner display and saves power. The driver circuit for an LED backlight module generally drives multiple strings of LEDs. Each string includes multiple LEDs connected in series.

Figure 1:
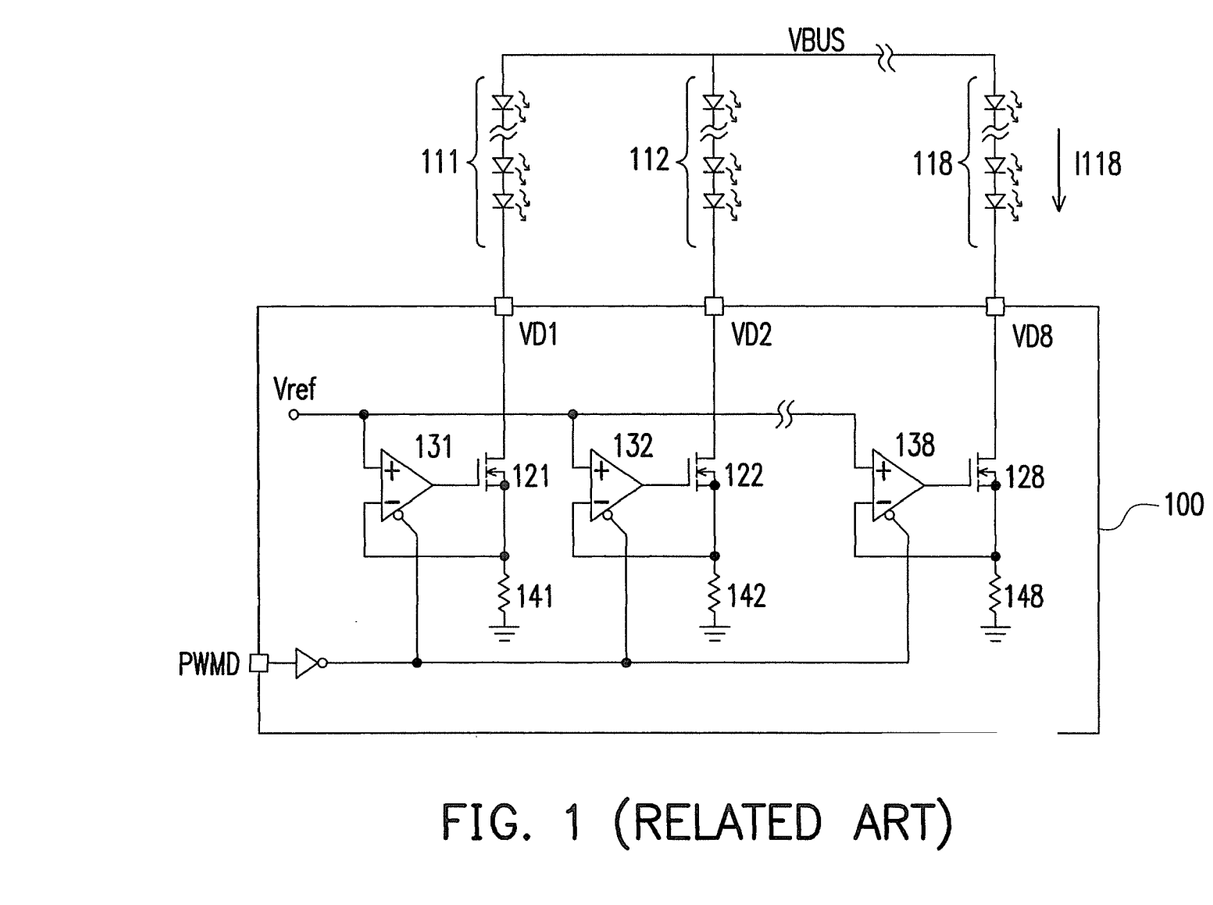
FIG. 1 is a schematic diagram showing a conventional LED driver circuit.

For example, FIG. 1 is a schematic diagram showing a constant-current conventional LED driver circuit 100. A boost pre-regulated stage (not shown) steps up an input voltage (not shown) to the bus voltage VBUS. The driver circuit 100 drives eight LED strings 111-118. The driver circuit 100 includes eight sections and each section drives one of the LED strings 111-118. For example, the section driving the LED string 118 includes the operational amplifier (OPA) 138, the N-channel metal-oxide-semiconductor field-effect transistor (N-MOSFET) 128, and the resistor 148. Each section of the LED driver circuit 100 is identical in function and circuit structure.

The brightness of an LED is in direct proportion to the current flowing through it. For consistent brightness and display quality, current matching among the LED strings is important. Due to factors such as fabrication variation, it is impossible for multiple LED strings to have exactly the same forward voltage when turned on. Therefore, a controlling mechanism is necessary to implement current matching of the LED strings.

Take the LED string 118 for example. The N-MOSFET 128, the OPA 138, and the resistor 148 constitute a control loop of negative feedback, which regulates the current through the resistor 148 and the LED string 118 to a predetermined value I118. I118=Vref/R148. As long as the reference voltage Vref is stable and the resistors 141-148 have well-matched resistances, the currents through the LED strings 111-118 are substantially the same. Please notice that N-MOSFET 128 and OPA 138 are operating like a low-dropout (LDO) linear regulator.

Figure 2:
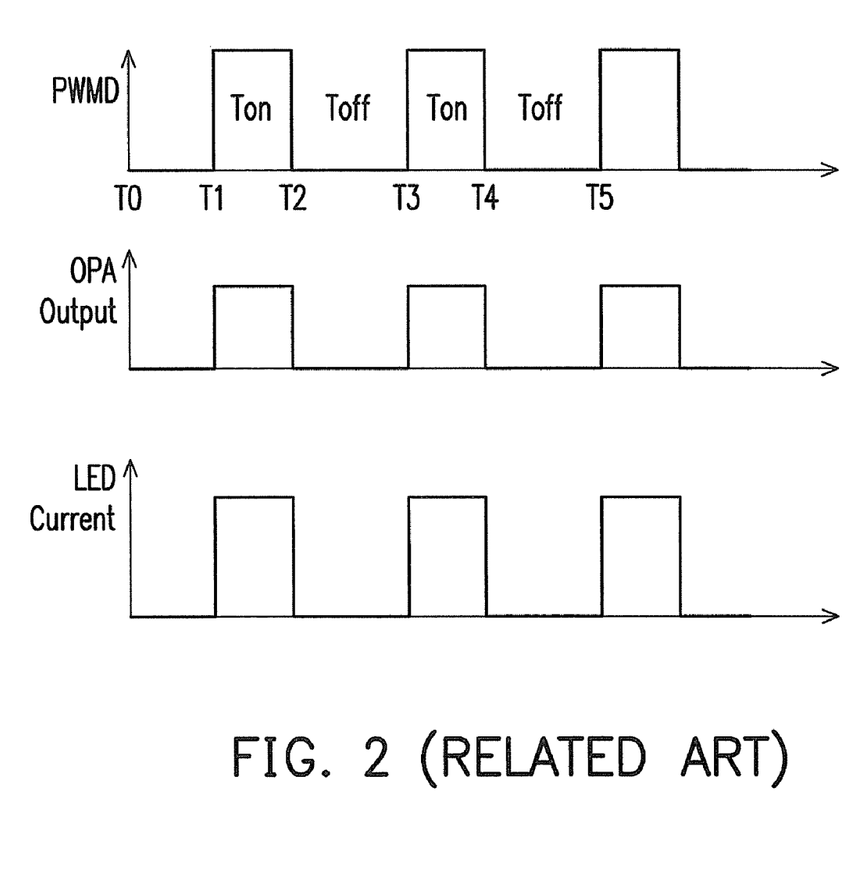
FIG. 2 is a waveform diagram showing some signals in the LED driver circuit in FIG. 1.

Further, the LED driver circuit 100 provides multi-level dimming of the LEDs. The dimming level of the LEDs is controlled by the dimming signal PWMD. FIG. 2 is a waveform diagram showing the dimming signal PWMD, the output of the OPA in each LED-string-driving section, and the current through each LED string in the LED driver circuit 100. During the time periods T1-T2 and T3-T4, the dimming signal PWMD is high. The OPA output to the gate of the corresponding N-MOSFET is turned on. The corresponding N-MOSFET is turned on accordingly. The OPA regulates the current through the corresponding N-MOSFET and the LED string to the predetermined value. During the time periods T2-T3 and T4-T5, the dimming signal PWMD is low. The OPA output to the gate of the corresponding N-MOSFET is turned off. The corresponding N-MOSFET is turned off accordingly. The current flowing through the LED string falls to zero. The average LED current is proportional to the duty cycle of the dimming signal PWMD. That is, Iave=D*Ion. Iave is the average LED current and Ion is the full stabilized LED current when the corresponding N-MOSFET 121-128 is turned on. The duty cycle is defined as, D=Ton/(Ton+Toff)= (T2−T1)/(T3−T1). Therefore, by varying the duty cycle of the dimming signal PWMD, one can control the average LED current Iave, thus, the effective brightness, of the LED strings 111-118.

Presently, most LEDs used for backlight applications are 20 mA devices. The forward voltage VF of an LED operating at 20 mA ranges from 3.0V to 3.8V over the temperature range of −20° C. to 80° C. and the manufacturing tolerance. And presently, there are many 6-channel and 8-channel LED backlight drivers from various IC vendors. For example, Maxim's MAX8790A, Texas Instruments' TP S61181, and Intersil's ISL97636A are 6-channel drivers. MAX17061 and Linear Technology's LT3760 are 8-channel drivers. Most of these 6-channel or 8-channel drivers have built-in N-MOSFETs with Vdss rating of 40V to 45V. In general, each channel can drive a sting of up to 10 LEDs in series connection. Therefore, an 8-channel LED backlight driver can drive up to 80 LEDs at the most.

A 42-inch LCD-TV typically uses 800 to 1200 LEDs for its backlight system. Therefore, it needs ten to fifteen such 8-channel drivers.

However, using so many drivers will complicate the current matching performance. This is due to the reference voltage Vref may vary among those driver chips. Further, too many driver chips add the wiring complexity and the backlight module (BLU) cost. Therefore, it would be ideal to substantially increase the number of LEDs per channel, thus to reduce the number of driver chips and wiring complexity. But unfortunately, the number of LEDs each channel can support is limited to the voltage rating of the N-MOSFET.

Figure 3:
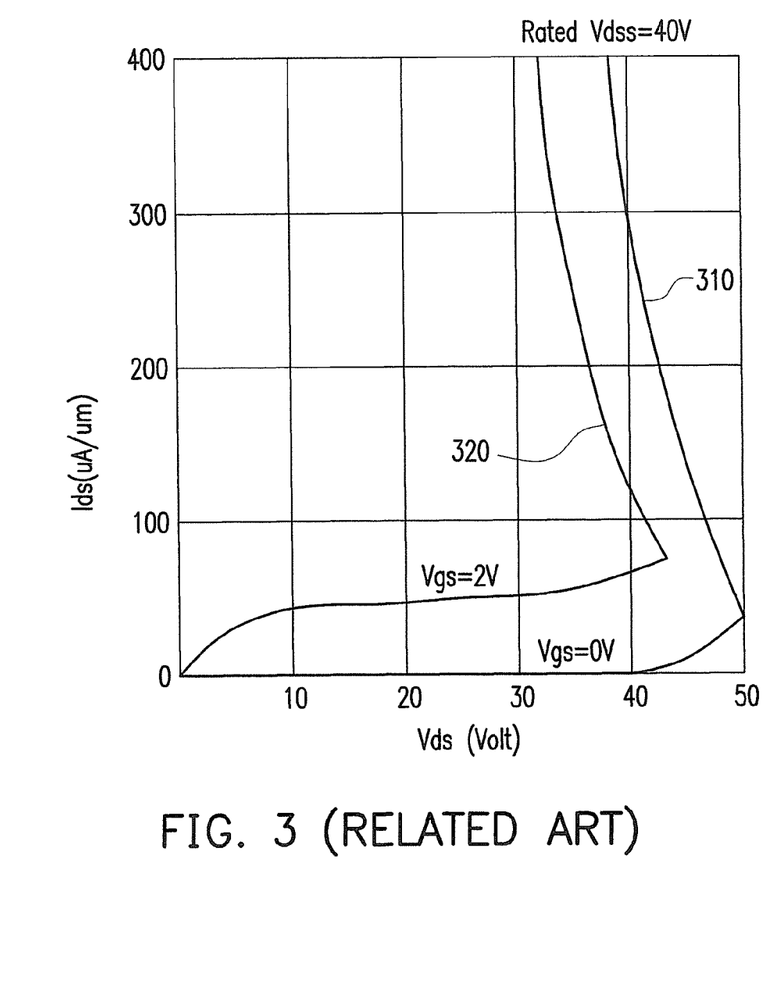
FIG. 3 is a diagram showing the output breakdown of a typical MOSFET.

FIG. 3 is a schematic diagram showing the output breakdown of a conventional N-MOSFET with a rated output breakdown voltage Vdss of 40 volts. The horizontal axis in FIG. 3 is the drain-to-source voltage Vds of the N-MOSFET, while the vertical axis in FIG. 3 is the drain-to-source current Ids of the N-MOSFET. With a gate-to-source voltage Vgs of 0, the N-MOSFET exhibits the current-voltage characteristics curve 310. With a gate-to-source voltage Vgs of 2 volts, the N-MOSFET exhibits the current-voltage characteristics curve 320.

When an N-MOSFET connected to an LED string is turned off (the gate-to-source voltage Vgs=0V) and the bus voltage VBUS is higher than the output breakdown voltage Vdss of the N-MOSFET, the drain-to-source voltage Vds of the N-MOSFET will rise toward the bus voltage VBUS until the N-MOSFET breaks down. Once the N-MOSFET breaks down, its drain-to-source current Ids rises quickly. How high the breakdown current will reach depends heavily on the semiconductor process and the N-MOSFET device structure. In general, the N-MOSFET's behavior in the breakdown region is erratic and highly unpredictable. In extreme situations, it may result in destructive device failure. The bus voltage VBUS is substantially equal to the combined forward voltage VF of the LED string. At the same time, the bus voltage VBUS should not exceed the rated output breakdown voltage Vdss in order to prevent breakdown. Therefore, the combined forward voltage VF of the LED string should not exceed Vdss. In other words, the number of LEDs in an LED string is limited by the rated output breakdown voltage Vdss of the corresponding N-MOSFET.

SUMMARY OF THE INVENTION

Accordingly, the present invention is directed to an LED driver circuit capable of driving longer LED strings. The LED driver circuit utilizes a voltage clamping device, which prevents the N-MOSFET from breakdown when the driving voltage or the combined forward voltage VF of the LED string exceeds the rated breakdown voltage Vdss of the N-MOSFET.

According to an embodiment of the present invention, an LED driver circuit is provided, which includes a transistor, a current regulator, and a voltage clamping structure. The voltage clamping structure further includes a release diode and a voltage clamping device. The transistor is coupled in series with an LED string. The LED string is coupled between the transistor and a bus voltage. The current regulator is coupled to the transistor for regulating the current through the transistor and the LED string to a predetermined current. The release diode has an anode coupled between the LED string and the transistor. The voltage clamping device is coupled between the cathode of the release diode and the ground for clamping the voltage level at the cathode of the release diode to a predetermined voltage.

In an embodiment of the present invention, the bus voltage is equal to the number of LEDs in the LED string multiplied by a first voltage. The first voltage is the maximum forward voltage among a plurality of sample LEDs measured under an operational temperature range of the LED driver circuit when a first current flows through the sample LEDs.

In an embodiment of the present invention, the number of LEDs in the LED string is equal to the predetermined voltage of the voltage clamping device divided by the difference between the first voltage and a second voltage. The second voltage is the minimum forward voltage among the aforementioned sample LEDs measured under the same operational temperature range when a second current flows through the sample LEDs. The first current is equal to the predetermined current of the current regulator, known as the full-brightness current, typically 20 mA. The second current is the current level below which the sample LEDs emit no visible light. The second current is also known as the dark current, typically at 1 uA level.

In an embodiment of the present invention, the voltage clamping device comprises a Zener diode coupled between the cathode of the release diode and the ground. In addition, the predetermined voltage of the voltage clamping device is the Zener voltage of the Zener diode.

In an alternative embodiment of the present invention, the voltage clamping structure comprises a parasitic transistor device which is capable of breaking down at a voltage level substantially equal to the aforementioned predetermined voltage and shunting the second current.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 4:
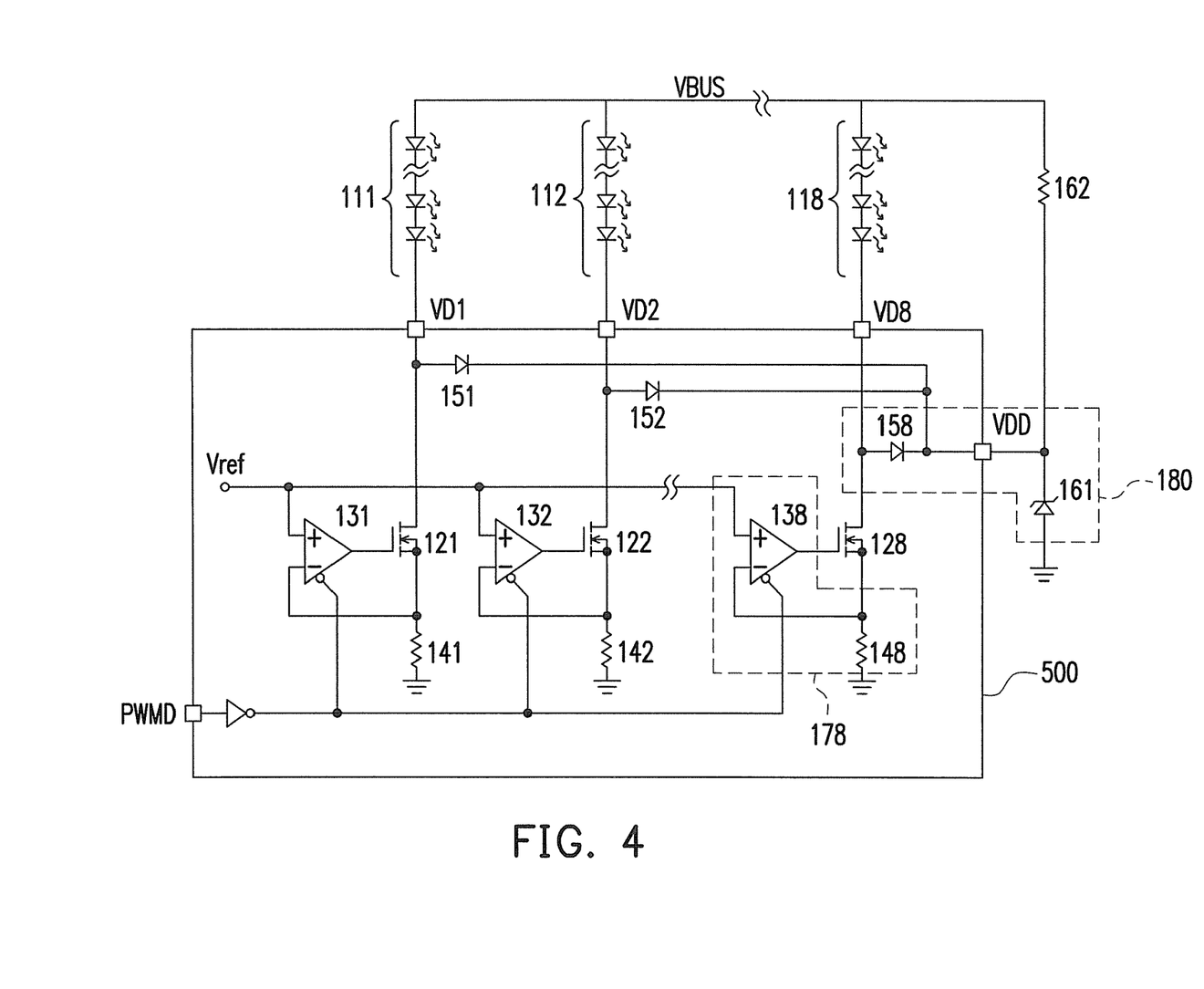
FIG. 4 is a schematic diagram showing an LED driver circuit according to an embodiment of the present invention.

FIG. 4 is a schematic diagram showing an LED driver circuit 500 according to an embodiment of the present invention. The LED driver circuit may be used to drive the LEDs in the backlight module of an LCD display. The LED driver circuit 500 includes eight identical sections. Each section drives one of the LED strings 111-118. Since each section is identical, the following discussions take the section driving the LED string 118 for example.

The section driving the LED string 118 includes an N-MOSFET 128, a current regulator 178, and a release diode 158. The N-MOSFET 128 is coupled in series with the LED string 118. The LED string 118 is coupled between the N-MOSFET 128 and a bus voltage VBUS. The current regulator 178 is coupled to the N-MOSFET 128. The anode of the release diode 158 is coupled between the LED string 118 and the drain of the N-MOSFET 128, while the cathode of the release diode 158 is coupled to a voltage clamping device 161. The release diode 158 and the voltage clamping device 161 constitute a voltage clamping structure 180.

The current regulator 178 includes a resistor 148 and an OPA 138. The upper terminal of the resistor 148 is coupled to the source of the N-MOSFET 128 and the lower terminal of the resistor 148 is grounded. The non-inverting input terminal of the OPA 138 is coupled to a reference voltage Vref. The inverting input terminal of the OPA 138 is coupled to the upper terminal of the resistor 148. The output terminal of the OPA 138 controls the current through the N-MOSFET 128 and the LED string 118. The N-MOSFET 128, the OPA 138, and the resistor 148 constitute a stable loop of negative feedback, which regulates the current through the N-MOSFET 128 and the LED string 118 to a predetermined operation current. The predetermined operation current is equal to the reference voltage Vref divided by the resistance of the resistor 148.

Similar to the LED driver circuit 100, the LED driver circuit 500 also provides multi-level LED dimming. The control terminal of each OPA 131-138 receives a dimming signal PWMD. Each OPA 131-138 is turned on or turned off in response to the same dimming signal PWMD. The dimming signal PWMD controls the dimming level of the LED strings 111-118.

When the dimming signal PWMD turns off the N-MOSFETs 121-128, their Vds voltages (VD1 to VD8) rise. The voltage VDD at the cathodes of the release diodes 151-158 also rises. When VDD becomes higher than a predetermined voltage, the voltage clamping device 161 becomes active and clamps the voltage VDD to the predetermined voltage. This is equivalent to clamping the N-MOSFETs 121-128 to the predetermined voltage. When the predetermined voltage is slightly lower than the rated output breakdown voltage Vdss of the N-MOSFETs 121-128, the voltage clamping device 161 can protect the N-MOSFETs 121-128 from breakdown. For example, the predetermined voltage of the voltage clamping device 161 may be lower than the output breakdown voltage Vdss of the N-MOSFETs 121-128 by one volt or two volts.

The upper terminal of an optional resistor 162 is coupled to the bus voltage VBUS, while the lower terminal of the resistor 162 is coupled to the voltage clamping device 161. The resistor 162 provides a small current (typically 1 uA) to maintain a steady-state voltage level VDD on the clamping device 161. When the dimming signal PWMD turns on the N-MOSFETs 121-128, the voltages at the drains of the N-MOSFETs 121-128 drops essentially to zero. The release diodes 151-158 separate the voltage VDD and the voltages at the drains of the N-MOSFETs 121-128 when the N-MOSFETs 121-128 are turned on.

Although the voltage clamping device 161 is outside the LED driver circuit 500, the voltage clamping device 161 may be included in the LED driver circuit 500 in some other embodiments of the present invention. This embodiment shows only one voltage clamping device 161. Alternatively, a separate voltage clamping device for each LED string may be used in some other embodiments of the present invention.

In this embodiment, the voltage clamping device 161 is a Zener diode. The cathode of the Zener diode 161 is coupled to the cathodes of the release diodes 151-158, while the anode of the Zener diode 161 is grounded. The predetermined voltage of the voltage clamping device is the Zener voltage of the Zener diode 161.

Figure 5:
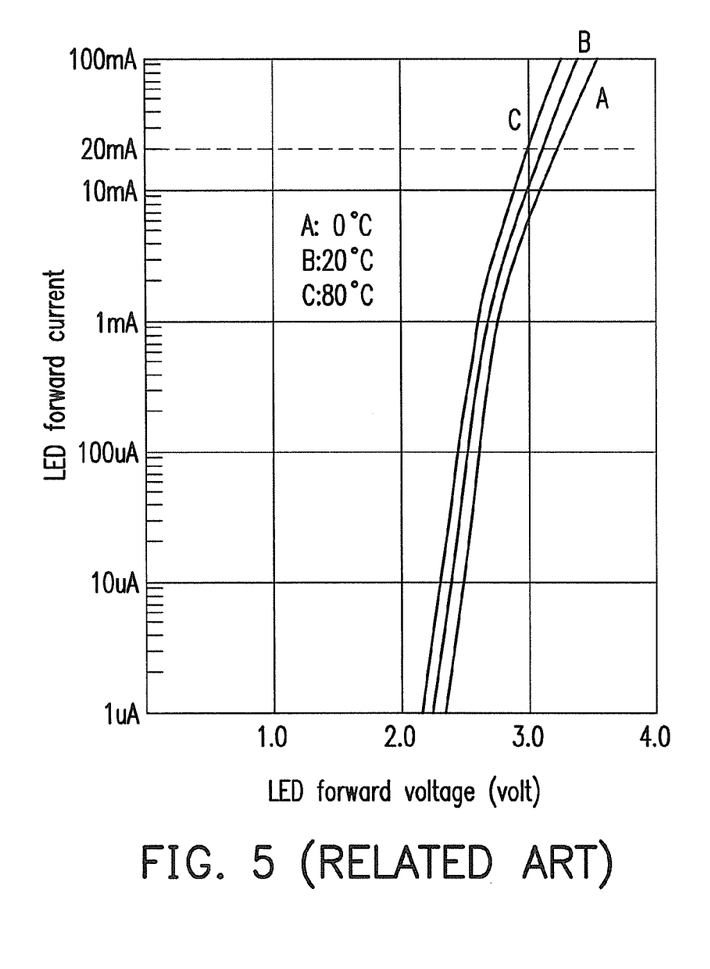
FIG. 5 is a diagram showing the forward current-voltage characteristics of a typical LED.

The LED driver circuit 500 can support more LEDs per channel than conventional LED driver circuits. The process for determining the number of LEDs in each string is discussed below. FIG. 5 shows the forward current-voltage characteristics of a typical LED in this embodiment of the present invention. First, a fully-on current and a fully-off current are determined for the LEDs. The fully-on current is equal to the predetermined current of the current regulator 178. Since the LEDs in this embodiment are 20 mA devices, the fully-on current is 20 mA. The fully-off current is the current level below which the LED emits no visible amount of light. The fully-off current is typically in the order of several uA.

The operational temperature range of the LED driver circuit 500 is from 0 to 80 Celsius degrees. The curves A, B and C in FIG. 5 are forward current-voltage characteristics curves of the LED at a temperature of 0, 20 and 80 Celsius degrees, respectively. The forward voltage VF when the fully-on current of 20 mA flows through the LED in FIG. 5 is measured 3.0V to 3.2V. On the other hand, the fully-off current is defined as 1 uA in this embodiment. The forward voltage VF at the fully-off current is measured 2.2V to 2.3V.

To simplify the discussion, we define the terms VF1 and VF2. VF1 is the forward voltage of an LED when it conducts a fully-on current, while VF2 is the forward voltage of an LED when it conducts a fully-off current. The voltage levels VF1 and VF2 of LEDs both depend on their manufacturing tolerance, operating temperature, and device aging, among other factors. The ranges of VF1 and VF2 can be determined after measuring a batch of sample LEDs representative of all device variations. Next, we define the voltages VF and VF2N. The voltage VF is the maximum VF1 among the batch of sample LEDs measured over the operational temperature range. The voltage VF2N is the minimum VF2 among the batch of sample LEDs measured over the same operational temperature range.

When the dimming signal PWMD turns on the N-MOSFETs 121-128, the bus voltage VBUS provides the combined forward voltage VF of the LEDs running at the 20 mA fully-on current. Since voltages across the N-MOSFETs 121-128 and the resistors 141-148 are relatively insignificant, the bus voltage VBUS must be substantially equal to N*VF1M, wherein N is the number of LEDs in each LED string 111-118. Thus, $$VBUS = N*VF1M \tag{Eq. 1}$$

A bus voltage VBUS equal to N*VF1M can drive N LEDs at VF1M each. The balance between VBUS and the actual combined VF of an LED string is absorbed by the Vds of the current regulating N-MOSFET for that LED string.

When the dimming signal PWMD turns off the N-MOSFETs 121-128, the drain-to-source voltage Vds of the N-MOSFETs 121-128 will rise but will be clamped by the voltage clamping device 161. Since the voltage drop of the release diodes 151-158 is relatively insignificant, the difference between VBUS and Vzener must be substantially equal to N*VF2N, such that the LEDs conduct less than 1 uA and are fully turned off. The combined current of the eight channels flowing into the Zener diode 161 is less than 8 uA, which is safe and introduces very low power dissipation, while the LEDs are completely turned off and invisible. Thus, $$Vzener = VBUS - N*VF2N \tag{Eq. 2}$$

But from Eq. 1, we know VBUS=N*VF1M. Therefore, $$Vzener = N*(VF1M - VF2N) \tag{Eq. 3}$$

In other words, the number of LEDs can be supported per string is $$N = Vzener/(VF1M - VF2N) \tag{Eq. 4}$$

For example, if VF1M is 3.8V, VF2N is 2.0V and Vzener is 38V, an N-MOSFET with an output breakdown voltage Vdss of 40V can support 38/(3.8−2.0)=21.11 LEDs (rounded off to 21 LEDs). The bus voltage VBUS can be raised to N*VF1M, which is in general more than twice of Vzener. If the LEDs have tighter tolerance, with lower VF1M and higher VF2N, the same 40V-rated N-MOSFET can support even more LEDs. For example, if VF is 3.6V and VF2N is 2.1V, then the LED driver circuit 500 can drive 38V/(3.6−2.1)=25.3 LEDs per string (rounded off to 25 LEDs). In this case, an 8-channel driver circuit can drive up to 25*8=200 LEDs, which are far more than conventional LED driver circuits can drive. This enhancement of the number of supported LEDs results from the voltage clamping structure 180. Without the voltage clamping device 180, the LED driver circuit 500 can support only up to 40V/3.8V=10.5 LEDs per string (rounded off to 10 LEDs).

In some other embodiments of the present invention, the voltage clamping structure 180 may comprises another form of semiconductor structure such as a parasitic transistor which is capable of breaking down consistently at a breakdown threshold voltage and shunting the aforementioned fully-off current. The breakdown threshold voltage may be substantially equal to the predetermined voltage of the voltage clamping device 161.

Figure 6:
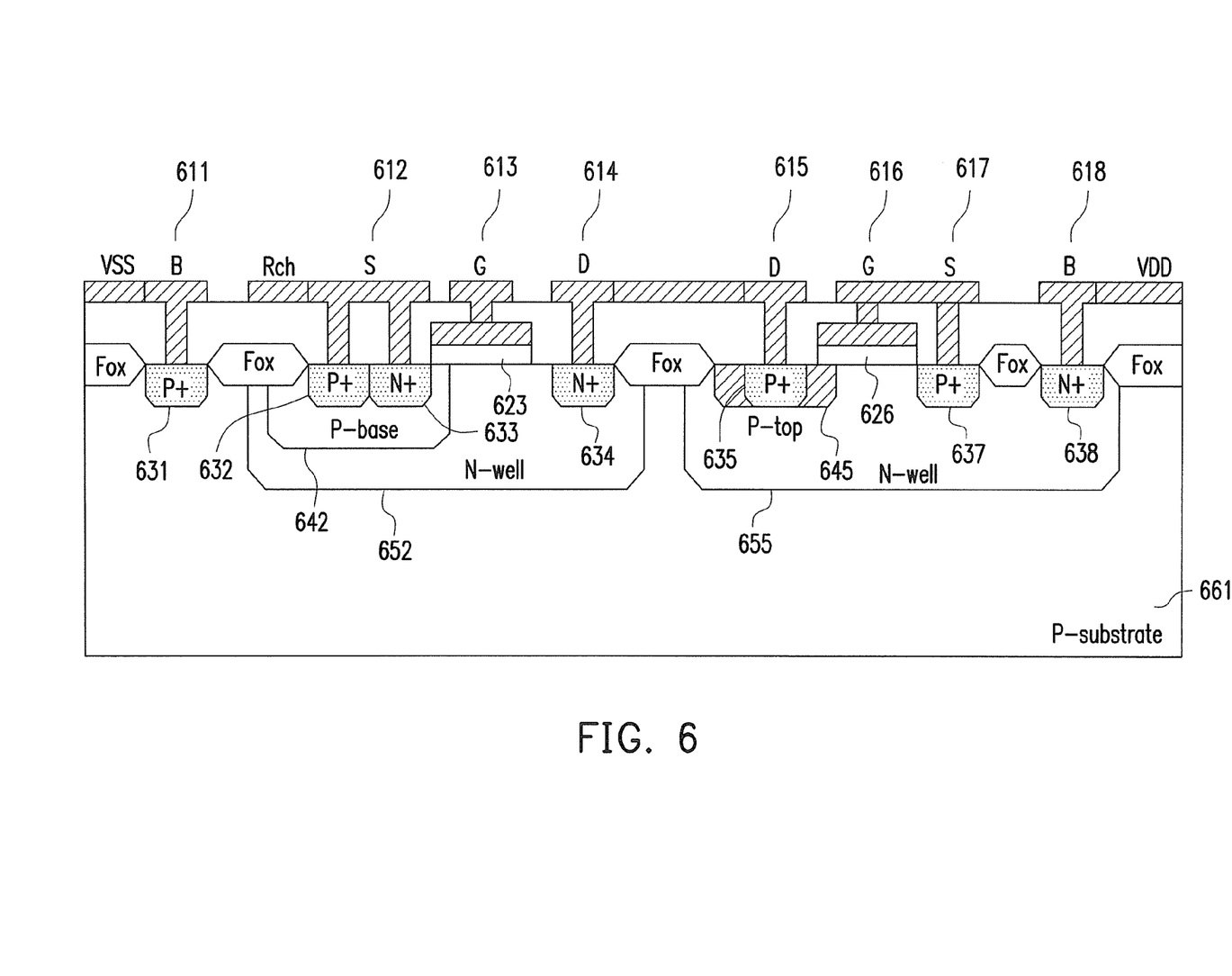
FIG. 6 is a cross-sectional view of the fabrication of a part of the LED driver circuit in FIG. 4.

An alternative embodiment of the present invention uses electrostatic discharge (ESD) protection diodes as the release diodes for the voltage clamping device 161. FIG. 6 is a cross-sectional view of the fabrication of the ESD diode 158 and the N-MOSFET 128 of the LED driver circuit 500. Since each driving section of the LED driver circuit 500 is identical, the fabrication of the other ESD diodes 151-157 and the corresponding N-MOSFETs 121-127 is the same.

The metal track 611 connects the P+ region 631 formed in the P-substrate 661 to the ground VSS of the driver circuit chip. The source (S) 612 of the N-MOSFET 128 includes a P+ region 632 and an N+ region 633 formed in the P-base 642. The P-base 642 is formed in an N-well 652. The N-well 652 is formed in the P-substrate 661. The metal track Rch connects the source 612 of the N-MOSFET 128 to the resistor 148. The gate (G) 613 of the N-MOSFET 128 has a piece of gate oxide 623 formed on the N-well 652. The drain (D) 614 of the N-MOSFET 128 includes an N+ region 634 fowled in the N-well 652.

The ESD diode 158 is implemented with an N-well P-channel metal-oxide-semiconductor field-effect transistor (PMOSFET). The drain (D) 615 of the PMOSFET includes a P+ region 635 formed in a P-top 645 and the P-top 645 is formed in an N-well 655. The N-well 655 is formed in the P-substrate 661. The gate (G) 616 of the PMOSFET has a piece of gate oxide 626 formed on the N-well 655. The source (S) 617 of the PMOSFET includes a P+ region 637 formed in the N-well 655. The body (B) 618 of the PMOSFET includes an N+ region 638 formed in the N-well 655. The gate 616 and the source 617 of the PMOSFET are shorted together. The body diode from the drain 615 to the body 618 of the PMOSFET device is used as the ESD diode 158. The drain 614 of the N-MOSFET 128 is connected to the drain 615 of the PMOSFET. The ESD diode 158 connects the drain 614 of the N-MOSFET 128 to the metal track VDD. The metal track VDD connects the cathode of the ESD diode 158 to the voltage clamping device 161. The insulating field oxide on the P-substrate 661 is denoted as Fox in FIG. 6.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light-emitting diode (LED) driver circuit, comprising:
    a transistor coupled in series with an LED string, wherein the LED string is coupled between the transistor and a bus voltage;
    a current regulator coupled to the transistor for regulating a current through the transistor and the LED string to a predetermined current; and
    a voltage clamping structure coupled between the LED string and the transistor for clamping the transistor to a predetermined voltage.

2. The LED driver circuit of claim 1, wherein the current regulator comprises:
    a first resistor comprising a first terminal coupled to the transistor and a second terminal grounded; and
    an operational amplifier comprising a non-inverting input terminal coupled to a reference voltage, an inverting input terminal coupled to the first terminal of the first resistor, and an output terminal controlling the current through the transistor and the LED string, wherein the predetermined current is equal to the reference voltage divided by the resistance of the first resistor.

3. The LED driver circuit of claim 2, wherein the operational amplifier further comprises a control terminal receiving a dimming signal and the operational amplifier is turned on or turned off in response to the dimming signal.

4. The LED driver circuit of claim 1, wherein the bus voltage is equal to the number of LEDs in the LED string multiplied by a first voltage, the first voltage is the maximum forward voltage among a plurality of sample LEDs measured under an operational temperature range of the LED driver circuit when a first current flows through the sample LEDs.

5. The LED driver circuit of claim 4, wherein the number of LEDs in the LED string is equal to the predetermined voltage of the voltage clamping device divided by a difference between the first voltage and a second voltage, the second voltage is the minimum forward voltage among the sample LEDs measured under the operational temperature range when a second current flows through the sample LEDs, the second current is a level below which the sample LEDs emit no visible amount of light.

6. The LED driver circuit of claim 5, wherein the first current is equal to the predetermined current of the current regulator and the first current is at least 100 times larger than the second current.

7. The LED driver circuit of claim 5, wherein the voltage clamping structure comprises a parasitic transistor with a breakdown threshold voltage substantially equal to the predetermined voltage, wherein the parasitic transistor is capable of shunting the second current.

8. The LED driver circuit of claim 1, wherein the predetermined voltage of the voltage clamping structure is slightly lower than an output breakdown voltage of the transistor.

9. The LED driver circuit of claim 1, wherein the voltage clamping structure comprises a release diode and a Zener diode, wherein an anode of the release diode is coupled between the LED string and the transistor, the Zener diode is coupled between a cathode of the release diode and a ground, the predetermined voltage of the voltage clamping structure is the Zener voltage of the Zener diode.

10. The LED driver circuit of claim 9, wherein a cathode of the Zener diode is coupled to a first terminal of a second resistor and a second terminal of the second resistor is coupled to the bus voltage.

* * * * *